(No Model.)
H. W. LIBBEY.
PASSENGER CAR.
No. 502,908. Patented Aug. 8, 1893.
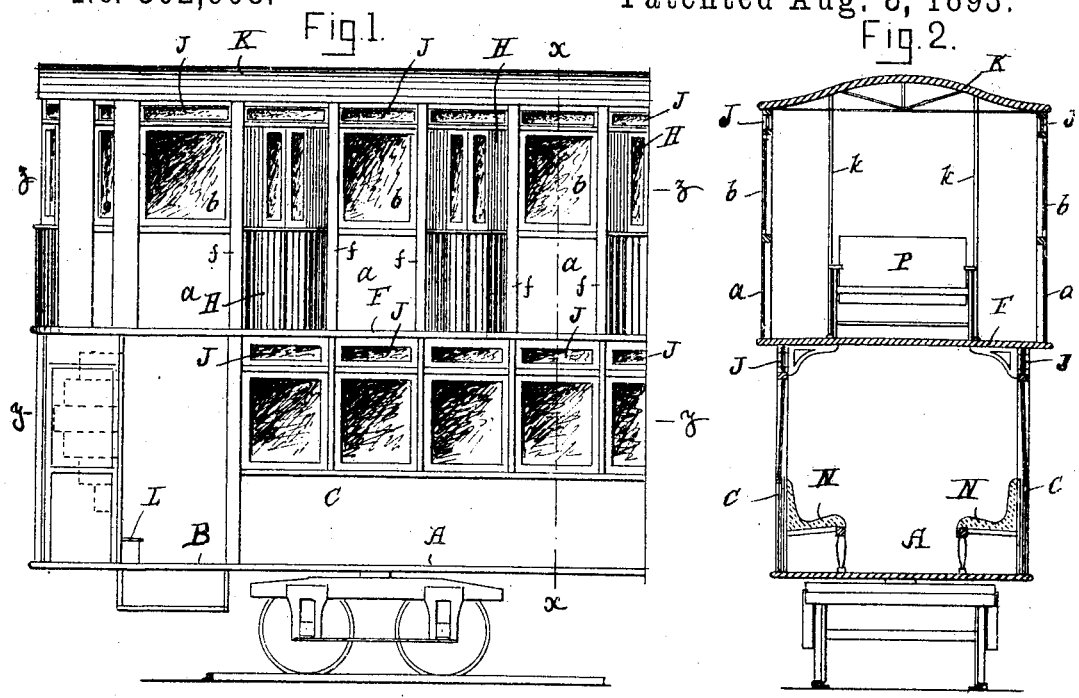
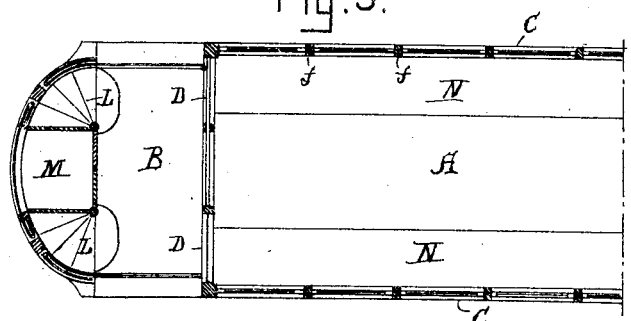
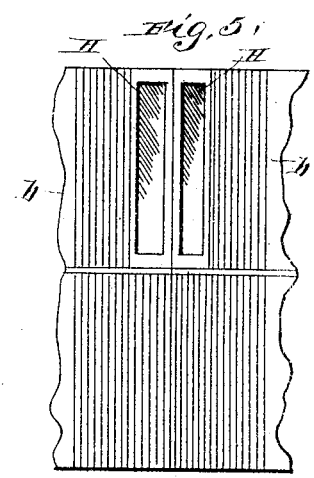
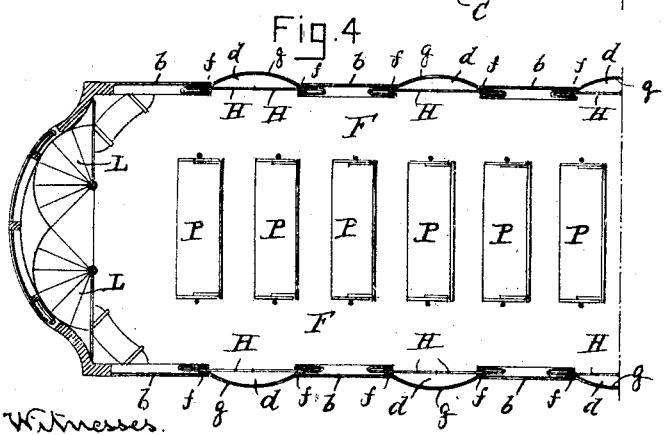
Witnesses.
Winifred G. Kerwin.
Caleb H. Swan.
Inventor.
Horace W. Libbey
by Edwin Planta
Attorney.

UNITED STATES PATENT OFFICE.

HOSEA W. LIBBEY, OF BOSTON, MASSACHUSETTS.

PASSENGER-CAR.

SPECIFICATION forming part of Letters Patent No. 502,908, dated August 8, 1893.

Application filed January 23, 1892. Serial No. 419,040. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Passenger-Cars, of which the following, taken in connection with the accompanying drawings, is a specification.

My invention relates to certain improvements in passenger cars, and the invention consists of a car having a closed lower compartment, and an upper compartment, the sides and ends of which can be entirely closed or partly open as may be desired, also in the arrangement of the stairways and other details of construction as hereinafter fully described and pointed out in the claims.

Referring to the accompanying drawings: Figure 1 represents a side view of a portion of a car embodying my invention. Fig. 2 is a vertical transverse section taken on line $x, x,$ of Fig. 1. Fig. 3 is a horizontal section taken on line $y, y,$ of Fig. 1. Fig. 4 is a horizontal section taken on line $z, z,$ of Fig. 1. Fig. 5 shows an elevation of one of the sliding doors. Fig. 6 is a horizontal section through the same when in the closed position. Fig. 7 is a similar section when the door is in an open position.

A, represents the lower floor of the car, B, one of the platforms, C the side walls which are preferably formed square at their lower ends as shown, and D end walls of the car.

F, is an upper floor that extends over the whole of the lower portion of the car, and also projects a few inches over the lower side walls C; this floor is flat or only slightly curved. Around this upper floor is arranged a series of standards $f$. Every alternate space between these standards is built in, the lower portion with a panel $a$, and the upper portion with a fixed glass window $b$.

H, H, are sliding doors by means of which the remaining spaces between the standards $f$, can be closed or left open as desired. These sliding doors are preferably half of solid material with a glass in the upper portion, and the other half formed of slats so that they will run in grooves within the side walls, the slatted portion being returned so as to overlap the solid portion whereby the door when opened will occupy but half the space longitudinally to what it does when closed. The floor F, in those portions between the standards $f$, that are to be closed by the doors H, projects in a circular form, a few inches beyond said standards as shown at $d$, (see Fig. 4) and around the outer edges of these projecting pieces are secured railings $g$, so that when the doors are open a person will be prevented from falling out. Each end of this upper portion is also provided with similar sliding doors so that said ends may be open or closed as may be required.

J, J, are pivoted sashes arranged over each of the windows in the lower portion, and also between the standards in the upper portion so that they can be opened for ventilation or closed as may be desired.

Over the entire upper portion of the car is a trussed roof K, from which rods or bars $k$ extend to the floor F, and assist in supporting the central portion of the same.

To ascend from the platform B, to the upper floor F, I provide at each end of the car two spiral stairways L, which meet and terminate in one step at the top as shown (see Fig. 4). Thus when a number of persons desire to descend as soon as they start upon the stairs they are divided into two lines. Thus crowding is prevented.

The space M, under the central portion of the stairways I utilize for a compartment for the use of the car hands. If a horse or electric car, then it would be occupied by the driver, and if it is desired that the driver should be as near the ground as possible then the floor of this compartment may be lowered as shown in dotted lines in Fig. 1. The front of this central portion is closed by two sliding doors half solid and half slatted as before described, and a sliding door or gate is arranged for closing the entrance to the platform B, on each side so that should it be desired to have the passengers enter and leave the car on only the near side, then the sliding door on the opposite can be closed and locked.

The seats M, in the lower compartment are arranged on each side longitudinally, but the seats P, in the upper compartment are preferably of the turn back class and are arranged in the central portion of the floor as shown, so that a clear foot way is had all round the floor.

What I claim is—

1. In a passenger car having a lower and upper compartment, the side and end walls of the upper compartment having permanently closed portions, and open spaces, doors each consisting of a half solid portion and the other half consisting of slats so that the slatted portion will be turned to overlap the solid portion when the doors are open said doors sliding within the closed portions whereby the open spaces may be closed substantially as set forth.

2. In a passenger car having a lower and upper compartment, the side walls of the upper compartment having permanently closed portions and open spaces, sliding doors whereby said open spaces may be closed, the floor at each open space projecting beyond the side in a circular form and fitted with a guard rail substantially as set forth.

3. In a passenger car having a lower and upper compartment, two spiral stairways each starting from the outer side of the platform, and near the top terminating in one common step in the center of the upper floor, substantially as set forth.

4. In a passenger car having a lower and upper compartment and two spiral stairways as described; a driver's compartment between the said spiral stairways substantially as set forth.

5. In a passenger car having a lower and upper compartment, seats arranged transversely in the central portion of the upper compartment and a foot way around the entire upper compartment said upper compartment being inclosed by walls consisting of solid and open portions, said open portions being closed by sliding doors adapted to turn so that the end will fold over the other portion, thereby occupying but a small space substantially as set forth.

In testimony whereof I have signed my name to this specification, in the presence of two subscribing witnesses, on this 30th day of December, A. D. 1891.

HOSEA W. LIBBEY.

Witnesses:
L. W. HOWES,
EDWIN PLANTA.